Patented Sept. 23, 1947

2,427,728

UNITED STATES PATENT OFFICE 2,427,728

ALKALINE EARTH PHOSPHOR

Henry G. Jenkins, Pinner, Alfred H. McKeag, North Wembley, and Peter W. Ranby, Wembley, England, assignors to General Electric Company, a corporation of New York No Drawing. Application November 20, 1943, Serial No. 511,170. In Great Britain April 10, 1941

Section 1, Public Law 690, August 8, 1946. Patent expires April 10, 1961

2 Claims. (Cl. 252—301.4)

The present invention comprises a new luminescent material or phosphor which when stimulated by an exciting agency emits light of unsaturated color which endures with appreciable intensity for a period of at least the order of one second after the excitation has ceased.

Such phosphors are useful in making screens for cathode ray tubes, particularly for purposes making a long afterglow desirable.

We have found that luminescent material prepared in accordance with our invention is appreciably excited by cathode rays having an energy as low as 100 electron-volts or higher and also by X-rays having a quantum energy of the order of 10,000 electron-volts, i. e., of wave length of the order of 1 Å. On the other hand, such material is not appreciably excited by ultraviolet radiation of wave length 2537 Å. or 3650 Å.

The phosphor embodying our invention comprises alkaline earth phosphate activated with dysprosium (Dy), a rare earth element. Our invention also comprises a method of manufacturing luminescent material by reaction and heat-treating steps which are hereinafter described.

The following examples illustrate the preparation of luminescent material according to our invention, some permissible modifications being described later. All of the reagents to which reference is made should be of a high degree of purity, such ordinarily as the grade of analyzed chemicals of so-called "reagent quality."

Example 1

A luminescent material embodying our invention may be prepared by dissolving 450 grams of calcium chloride in 2 liters of distilled water, the solution being purified by the addition of 15 milliliters (ml.) of ammonium sulfide (ordinary laboratory reagent) to precipitate impurities. Any precipitate which is formed is filtered off. A second solution is prepared by dissolving 376 grams of ammonium carbonate in 2 liters distilled water, this solution being similarly purified.

The two solutions are mixed, resulting in a precipitate of calcium carbonate which is removed by filtration, the precipitate being washed six times with distilled water and dried at 160° C. Forty grams of calcium carbonate are mixed with 52 grams of diammonium hydrogen phosphate and with 50 ml. of a solution of dysprosium sulfate containing 0.1 percent of dysprosium.

The mixture is made into a paste which is dried at 160° C. The dried mixture is thoroughly ground. When fired at a temperature of 1050° to 1100° C. for about one hour in air it is converted into a phosphor which is removed at this temperature and is lightly ground.

Example 2

Alternatively, 300 grams of calcium carbonate are dissolved in 2 liters of dilute hydrochloric acid containing 500 ml. of pure hydrochloric acid ("Anala R" grade). The resulting liquid is filtered. It will be referred to as solution A. Another solution, B, is prepared by dissolving 264 grams of diammonium hydrogen phosphate in one liter of boiling distilled water, the solution then being filtered. Five ml. of solution B are added to the whole of solution A, the precipitate being filtered off and discarded. The remainder of solution B is added to the filtrate, resulting in a precipitate. This precipitate is filtered off, washed six times with boiling water and dried at 160° C. The dried product is thoroughly ground.

Twenty grams of the precipitate are mixed with 20 ml. of the dysprosium solution referred to in Example 1. The mixture is dried at 160° C., thoroughly ground and heated to a temperature of about 1050° to 1100° C. for one hour in an open crucible. After cooling the product is lightly reground.

Example 3

In accordance with a third and preferred example of our invention calcium carbonate is prepared as in the first example. Pure phosphoric acid ("Anala R" grade) is diluted to a specific gravity of 1.293. The solution should contain about 422 grams of $P_2O_5$ per liter. Four hundred grams of calcium carbonate are added to 672 ml. of the diluted phosphoric acid with thorough stirring. The mixture, while still being stirred, is heated until effervescence ceases. The precipitate is filtered off, washed very thoroughly with distilled water, dried at 160° C. and ground.

Dysprosium sulfate solution is added in such amount as to give 0.1 percent Dy in the resulting mixture and hence in the phosphor from this mixture. The mixture is dried at 160° C., ground and fired at about 1080° C. for about one hour in air. The resulting phosphor is lightly ground and washed thoroughly with hot distilled water.

The dysprosium solutions used in the foregoing examples should be of the highest obtainable purity. Impurities which are known to be generally deleterious to luminescent materials, such for example as iron, must be rigidly excluded. A slight admixture of other rare earths with which dysprosium compounds usually are associated may not always be deleterious. However, we have found that 2 per cent of terbium may be definitely deleterious. In all of the examples, the percentage of activating dysprosium in the phosphor works out as a minor fraction of one per cent.

We wish it to be understood that strontium or barium may replace calcium and that in the preparation of our new luminescent material the ratio of the phosphate radical may depart from the ratio in the aforesaid examples. It is also possible to employ mixtures of two or more of the alkaline earth compounds. We have found calcium to be generally preferable to barium and strontium if the longest possible afterglow is required. We have found that the best ratio of phosphate radical to metal is intermediate between the ratios characteristic of the metaphosphate and the orthophosphate. X-ray analysis suggests that the best lattice is that characteristic of the pyrophosphate.

The considerations with respect to proportions and temperature at which the activating heat treatment are carried out apply mainly when the primary object in practicing our invention is to obtain the longest possible afterglow. It is possible by comparatively slight modifications in the method of manufacture to produce materials, the luminescence of which, while the excitation lasts, is not materially different from that of the materials described, but which have a shorter afterglow. This can be achieved, for example, by adding some terbium compound to the dysprosium compound, by substituting barium or strontium for the calcium, and by changing (particularly by decreasing) the temperature of the activating heat treatment. By these modifications materials can be produced, the after glow of which is so short that they are useful in the manufacture of screens of television receivers.

The materials prepared as described herein when excited by cathode rays of a thousand or preferably a few thousand electron volts energy or by X-rays having a wavelength of about 1 Å. are characterized by a cream-colored luminescence which is still visible several seconds after the excitation has ceased. The spectrum of the luminescent light consists largely of strong yellow and blue lines and bands.

What we claim as new and desire to secure by Letters Patent of the United States is:

1. A phosphor consisting essentially of a matrix of alkaline earth metal phosphate of pyrophosphate composition activated with a proportion of dysprosium of about a tenth of a per cent and characterized by visible fluorescence with substantial afterglow under both cathode ray and X-ray excitations.

2. A phosphor consisting essentially of a matrix of calcium phosphate of pyrophosphate composition activated with a proportion of dysprosium of about a tenth of a per cent and characterized by visible fluorescence with substantial afterglow under both cathode ray and X-ray excitations.

HENRY G. JENKINS.
ALFRED H. McKEAG.
PETER W. RANBY.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,241,951 | Huniger et al. | May 13, 1941 |
| 2,284,055 | Huniger et al. | May 26, 1942 |
| 2,306,567 | Roberts | Dec. 29, 1942 |
| 2,306,626 | Huniger et al. | Dec. 29, 1942 |